Dec. 8, 1970  G. H. McLAFFERTY  3,546,069
GASEOUS NUCLEAR ROCKET ENGINE
Filed May 15, 1968  2 Sheets-Sheet 1

INVENTOR.
GEORGE H. McLAFFERTY
BY
Jacob N. Erlich
ATTORNEY

United States Patent Office 3,546,069
Patented Dec. 8, 1970

3,546,069
GASEOUS NUCLEAR ROCKET ENGINE
George H. McLafferty, Manchester, Conn., assignor to the United States of America as represented by the Secretary of the Air Force
Filed May 15, 1968, Ser. No. 729,472
Int. Cl. G21c 15/00
U.S. Cl. 176—52                    11 Claims

ABSTRACT OF THE DISCLOSURE

A vortex stabilized gaseous nuclear rocket engine in which helium gas is injected into a vortex tube to form a buffer layer between the outer periphery of a fuel and the inner surface of a propellant.

BACKGROUND OF THE INVENTION

This invention relates generally to nuclear rocket engines, and more particularly to a vortex stabilized gaseous nuclear rocket engine.

It has been recognized for a number of years that values of specific impulse considerably greater than those obtainable from solid-core nuclear rockets could be realized by employing nuclear fuel in gaseous rather than solid form, since the use of fuel in gaseous form circumvents the limitation on propellant temperature inherent when heat is transferred to the propellant through a solid material. One such gaseous rocket is the vortex stabilized gaseous nuclear rocket. The vortex stabilized gaseous nuclear rocket concept is based on the transfer of heat by thermal radiation from gaseous nuclear fuel held in position by the fluid forces in a vortex to a propellant such as seeded hydrogen passing axially over the fuel region.

The results of both the theoretical and experimental fluid mechanics investigations indicate that a heavy (high-molecular-weight) gas can be stably suspended in a vortex of light gas under appropriate conditions. According to theory, one of these conditions is that the circulation (product of tangential velocity and local radius) in the heavy-gas region be less than that in the surrounding light gas.

In the open-cycle vortex stabilized gaseous nuclear engine, propellant is injected at the peripheral wall of the cavity to drive the vortex and then spirals axially around the central fuel-containment region toward the exhaust nozzle. Nuclear fuel is injected into the central region of the cavity where it is contained for a period of time by the vortex flow field. Heat balance considerations require that additional (bypass) propellant flow must be used to remove energy deposited in the moderator by neutrons and gamma rays. This bypass propellant is then mixed with the cavity propellant between the cavity and the exhaust nozzle.

One of the fluid mechanics problems of all such open-cycle engine concepts is to simultaneously provide the correct amount of fuel stored, the correct propellant weight flow rate, and an acceptably low fuel loss rate. Nuclear fuel is extremely expensive. If the fuel loss rate is high, the cost of the fuel for a mission will be greater than the economic gains resulting from the high specific impulse of the engine. For example, for a representative manned Mars mission, the open-cycle engine must have a ratio of total propellant weight flow rate (cavity flow plus bypass flow) to fuel loss rate, $W_P/W_F$, of approximately 37 to have an overall mission cost of one-third that for a solid-core nuclear rocket. A mission cost advantage of about this amount—one-third, relative to a solid-core nuclear rocket—is an important requirement for the development of the open-cycle vortex stabilized gaseous nuclear engine.

The major problem in the operation of the above gaseous nuclear rocket engine is that extremely high temperatures are required in the fuel region because of the back radiation from the hydrogen propellant. This back radiation is caused by the high opacity of hydrogen at temperatures between 15,000° R. and 80,000° R. It has been found that the temperatures near the outside surface of the nuclear fuel are between 60,000° R. and 120,000° R., and the temperatures near the centerline of the nuclear fuel are from 100,000° R. to 25,000° R. These high temperatures adversely effect the amount of nuclear fuel that can be stored in a vortex tube of a given size and hence cause an increase in the overall engine size required for operation of the engine.

SUMMARY OF THE INVENTION

The instant invention improves the basic operation of the vortex stabilized gaseous nuclear rocket engine and overcomes the above problem by providing a gaseous buffer layer between the nuclear fuel near the tube centerline and the hydrogen propellant near the tube periphery. The use of such a buffer gas decreases the loss rate of fuel by surrounding the fuel with a gas which will diffuse less rapidly into the fuel region. In accordance with this invention, the buffer gas should have as high a molecular weight as possible.

Helium is employed as this buffer gas rather than a higher-molecular weight buffer because helium is extremely transparent to thermal radiation up to high temperatures and has the further advantage of not suffering the rapid increase in opacity with temperatures between 15,000 and 20,000 R. which is characteristic of hydrogen. This low opacity is due to the fact that helium has the highest ionization potential (24.6 ev.) of any substance. The helium would replace the hydrogen in the fuel region and would, therefore, reduce the opacity, the temperature gradients, and the temperatures in the fuel region.

A helium buffer gas could also serve to reduce the temperatures at the interface between the propellant and the fuel regions. If the engine were designed such that helium were substituted for hydrogen at all temperatures where hydrogen has high opacity, it would be possible to maintain temperatures at the edge of the fuel region approximately equal to black-body radiating temperatures corresponding to the heat flux at the station. The specific impulse of such a configuration would be limited if the maximum temperature were determined by the temperature at which hydrogen becomes very opaque. However, higher average temperatures and resulting higher values of specific impulse might be obtained by seeding selected streamlines in the middle of the hydrogen propellant region in order to obtain higher local temperatures.

In order to inject helium at the proper position, separate helium ducts must be employed in the engine. The helium must contain a small amount of seed in order to cause its temperature to rise to temperatures intermediate between that of the propellant and the fuel. The helium must also be injected at the angular momentum which is midway between the low angular momentum of the fuel and the high angular momentum of the propellant.

The temperatures in the region near the outside edge of the nuclear fuel are reduced by a factor on the order of two by the use of the helium buffer layer of this invention. This reduction in temperature substantially increases the amount of nuclear fuel which can be suspended in the tube and causes a desirable reduction in the minimum over-all engine size required.

A space vehicle powered by the gaseous nuclear rocket engine of the instant invention having a thrust-to-weight ratio of 20 and a specific impulse of 2500 sec. could be used for single-stage round-trip flights from the surface of the earth to the moon or nearby planets with payload weights equal to 10 to 30% of the take-off gross weight from the earth. Since no staging of the vehicle is required, as with solid-core nuclear rockets, it is possible to markedly reduce the trip cost by the use of the same vehicle for a large number of flights.

It is therefore an object of this invention to provide a vortex stabilized gaseous nuclear rocket engine which uses a buffer gas to decrease the loss rate of fuel by surrounding the fuel with a gas which will diffuse less rapidly into the fuel region.

It is a further object of this invention to provide a vortex stabilized gaseous nuclear rocket engine which replaces the propellant in the fuel region with a buffer gas in order to reduce the opacity, the temperature gradients, and the temperatures in the fuel regions.

It is still a further object of this invention to provide a vortex stabilized nuclear rocket engine which has high values of specific impulse.

It is another object of this invention to provide a vortex stabilized nuclear rocket engine which has a reduced temperature near the outside edge of the nuclear fuel so as to substantially increase the amount of nuclear fuel which can be suspended in the vortex tube.

It is still another object of the invention to provide a vortex stabilized nuclear rocket engine which is economical to produce and which utilizes conventional, currently avaliable components that lend themselves to standard mass production manufacturing techniques.

For a better understanding of the present invention, together with other and further objects thereof, reference is had to the following description taken in connection with the accompanying drawings and its scope will be pointed out in the appended claims.

DESCRIPTION OF THE PREFERRED EMBODIMENT

Figure 2:
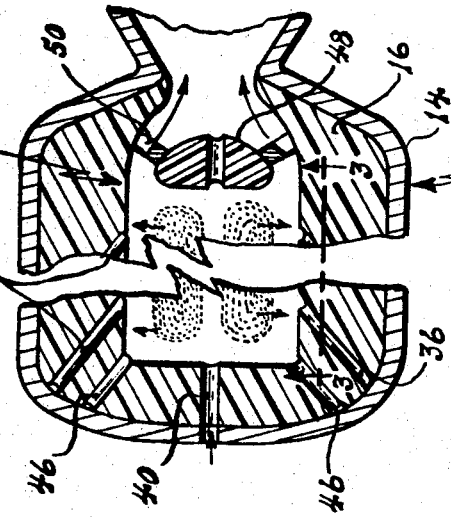
FIG. 2 is a side elevation taken along line 2—2 of FIG. 1.
Figure 1:
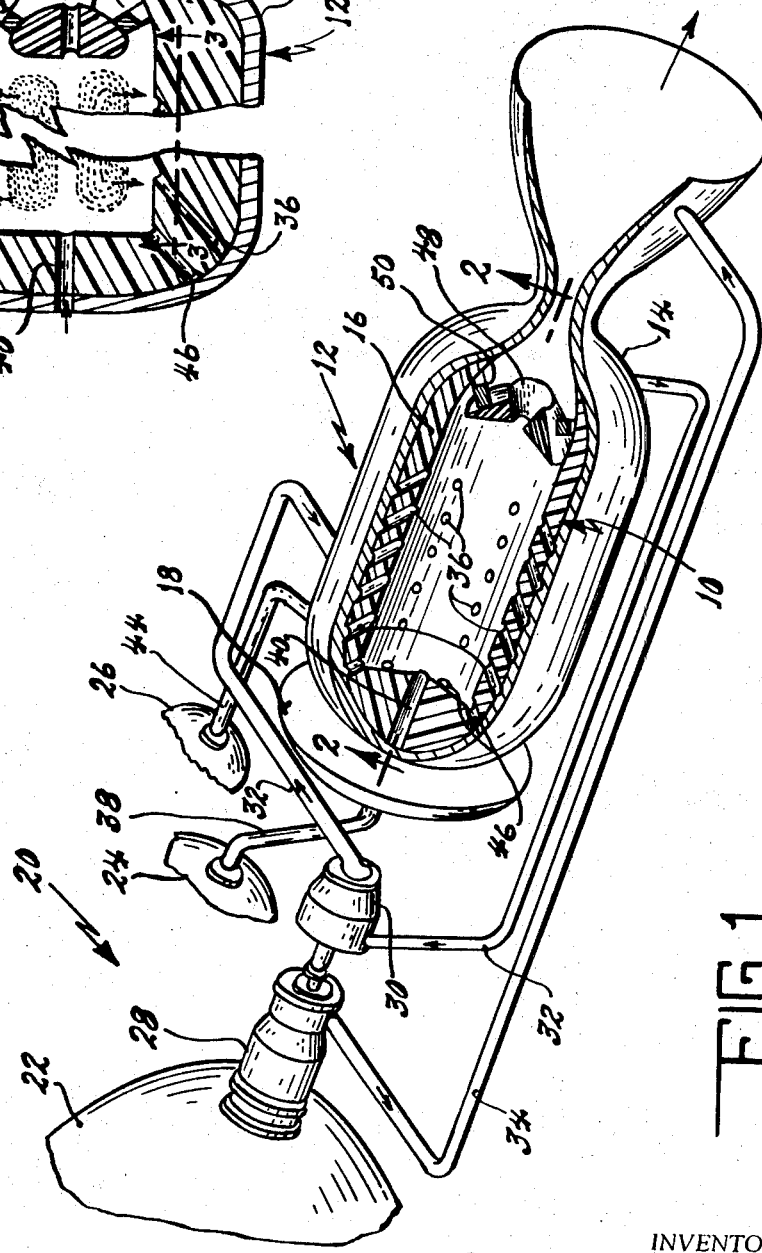
FIG. 1 represents a perspective view of the vortex stabilized nuclear rocket engine of this invention shown partially in section.

For a more detailed description of the invention, reference is now made to FIG. 1, wherein is shown the location of the vortex tube 10 within the vortex stabilized gaseous nuclear rocket engine 12. The rocket engine 12 has a pressure shell 14 encasing the vortex tube 10. The vortex tube 10, shown more clearly in FIG. 2, has a moderator-reflector wall 16 made of any suitable material such as ceramic. Referring again to FIG. 1, a heat shield 18 separates the vortex tube 10 from the supply system 20. The supply system 20 is made up of a plurality of storage tanks 22, 24 and 26. One of the tanks 22 contains a suitable propellant such as hydrogen, another tank 24 contains a suitable gaseous nuclear fuel, while the remaining tank 26 contains a high molecular weight buffer gas such as helium. These tanks 22, 24 and 26 are connected to the pressure shell 14 and vortex tube 10 by a plurality of pipes.

Attached to the forward end of propellant tank 22 is a pump 28 and a turbine 30, the operation of which will be explained hereinbelow. One pipe 32 runs from turbine 30 to the pressure shell 14, through a plurality of pipes (not shown), and back to the turbine 30, while another pipe 34 connects the pump 28 to a plurality of propellant ducts 36 within moderator-reflector wall 16 in order to feed propellant to the vortex tube 10. The nuclear fuel is injected directly into the vortex tube 10 by a pipe 38 leading from nuclear fuel tank 24 to opening 40 within moderator-reflector wall 16. The buffer layer of gas is injected into the vortex tube 10 from tank 26 through pipe 44 and then through a plurality of buffer ducts 46 within the rear portion of moderator-reflector wall 16. A centerbody 48, made of suitable material such as ceramic, held in position by struts 50, enables the nuclear reaction to build up in intensification within vortex tube 10, so as to provide a greater thrust force.

MODE OF OPERATION

Figure 3:
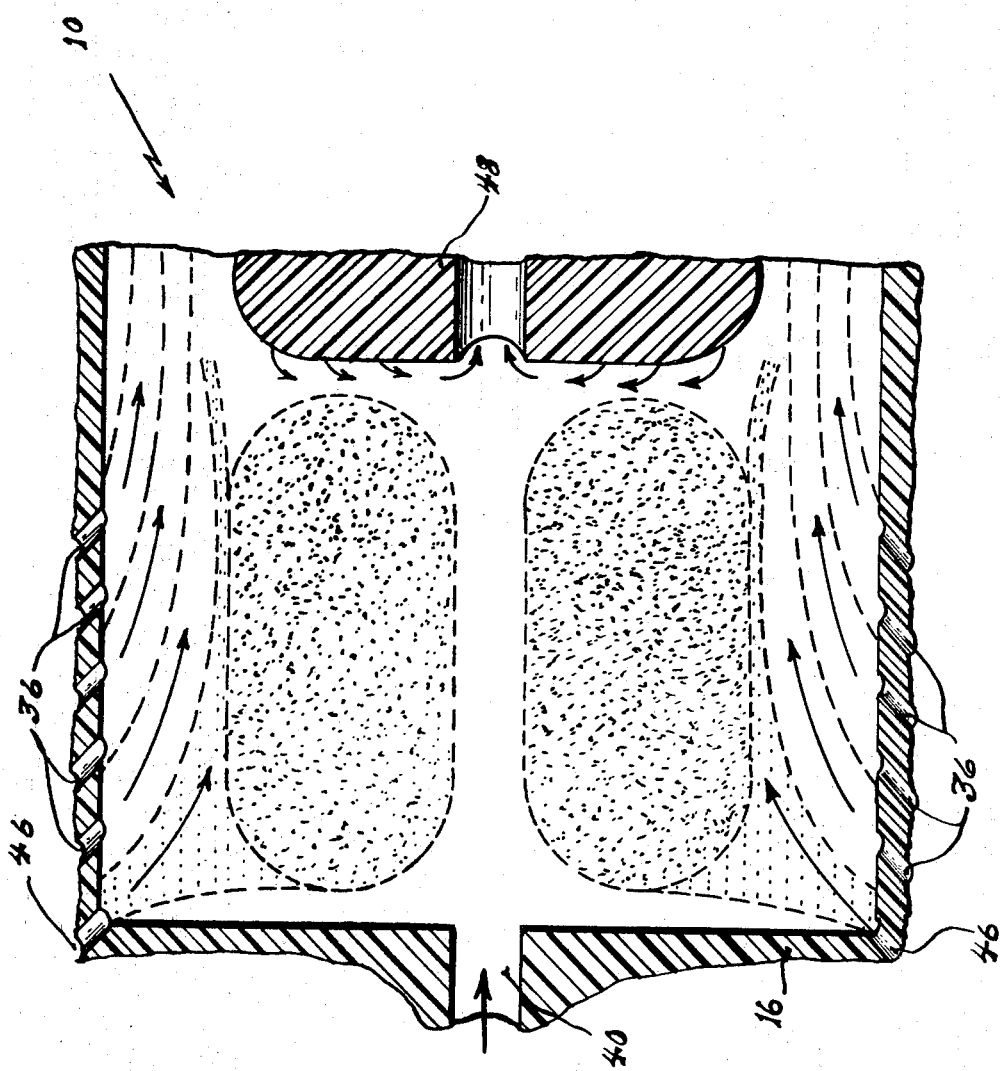
FIG. 3 is an enlarged fragmentary view taken along line 3—3 of FIG. 2, showing with specificity the buffer layer of gas adjacent the nuclear fuel.

Referring more particularly to FIG. 3, the following description sets forth an operating procedure in accordance with the instant invention:

(1) Hydrogen propellant is injected into the vortex tube 10 through propellant ducts 36, initiating the rotating flow of propellant within the tube. The compressor power required to obtain the desired gas velocities within the vortex tube 10 is obtained by the use of an auxiliary chemically powered turbine (not shown);

(2) The nuclear fuel is now injected into the vortex tube 10 through opening 40 in the form of a high-vapor-pressure compound;

(3) A nuclear reaction is thereby initiated, at which time a portion of the injected propellant flows toward the axis of the tube via boundary layers on the end walls of the vortex tube 10 and absorbs the thermal energy radiated axially from the fuel-containment region. Control of the neutron flux associated with the nuclear reaction can be obtained by use of control rods located around the outer periphery of the engine, by controlled injection of a gaseous neutron absorber, or by control of the fuel injection rate;

(4) The helium buffer gas is injected through ducts 46 into vortex chamber 10 between the outer periphery of the fuel and the inner surface of the propellant at an angular momentum which is midway between the low angular momentum of the fuel and the high angular momentum of the propellant;

(5) The chemically powered turbine (not shown) is now replaced by the turbine 30 (shown in FIG. 1) used for steady-state operation. Such a switch requires that sufficient power be deposited in the solid structure of the engine to permit heating of the hydrogen flow between the pump 28 exit and the turbine 30 inlet; and (6) The power level of the reactor is thus increased to operating level.

Although the invention has been described with reference to a particular embodiment, it will be understood to those skilled in the art that the invention is capable of a variety of alternative embodiments such as a plurality of vortex tubes and/or vortex tubes of other configurations within the spirit and scope of the appended claims.

What is claimed is:

1. A vortex stabilized gaseous nuclear rocket engine comprising a pressure shell, a vortex tube within said pressure shell, said vortex tube having a moderator-reflector wall, a supply system operatively connected to said vortex tube, said supply system including means for supplying a nuclear fuel, means for supplying a propellant and means for supplying a buffer gas, said propellant and said buffer gas being different gases, said vortex tube further comprising a plurality of ducts, and a central opening, wherein one series of said ducts are connected to said means for supplying a propellant, the other series of said ducts are connected to said means for supplying a buffer gas and said central opening is connected to said means for supplying a nuclear fuel, whereby upon operation of said nuclear engine the buffer gas is injected through said other ducts between the outer periphery of the fuel and the inner surface of the propellant.

2. A vortex stabilized gaseous nuclear rocket engine as defined in claim 1 wherein said buffer gas has an extremely high molecular weight and ionization potential.

3. A vortex stabilized gaseous nuclear rocket engine as defined in claim 2 wherein said buffer gas is helium.

4. A vortex stabilized gaseous nuclear rocket engine as defined in claim 3 wherein said propellant is hydrogen.

5. A method of improving the operation of a vortex stabilized gaseous nuclear rocket engine comprising the steps of first, injecting propellant into a vortex tube, second, injecting a nuclear fuel into the vortex tube thereby initiating a nuclear reaction therein, and third, injecting a buffer gas which is different from said propellant between the outer periphery of the fuel and the inner surface of the propellant.

6. A method of improving the operation of a vortex stabilized gaseous nuclear rocket engine as defined in claim 5 wherein said buffer gas has an extremely high molecular weight and ionization potential.

7. A method of improving the operation of a vortex stabilized gaseous nuclear rocket engine as defined in claim 6 wherein said buffer gas is helium.

8. A method of improving the operation of a vortex stabilized gaseous nuclear rocket engine as defined in claim 7 wherein said propellant is hydrogen.

9. A method of improving the operation of a vortex stabilized gaseous nuclear rocket engine as defined in claim 5 wherein said buffer gas is injected at an angular momentum which is midway between the low angular momentum of the fuel and the high angular momentum of the propellant.

10. A method of improving the operation of a vortex stabilized gaseous nuclear rocket engine as defined in claim 7 wherein said buffer gas is injected at an angular momentum which is midway between the low angular momentum of the fuel and the high angular momentum of the propellant.

11. A method of improving the operation of a vortex stabilized gaseous nuclear rocket engine as defined in claim 8 wherein said buffer gas is injected at an angular momentum which is midway between the low angular momentum of the fuel and the high angular momentum of the propellant.

References Cited
UNITED STATES PATENTS 3,202,582   8/1965   Rom _____ 176—39

OTHER REFERENCES

"Gaseous-Core Nuclear Rockets," by Jerry Grey, October 1959, Astronautics, pp. 23–25, 110 and 112.

SAMUEL FEINBERG, Primary Examiner

U.S. Cl. X.R.

60—203; 176—39